May 9, 1961 C. W. HELSLEY, JR 2,983,331
INVERTED FLIGHT RESERVOIR
Filed July 8, 1957 3 Sheets-Sheet 1

INVENTOR.
CHARLES W. HELSLEY, JR.
BY
Charles F. Dinkler
ATTORNEY

May 9, 1961 C. W. HELSLEY, JR 2,983,331
INVERTED FLIGHT RESERVOIR
Filed July 8, 1957 3 Sheets-Sheet 2

INVENTOR.
CHARLES W. HELSLEY, JR.
BY
Charles F. Dinkler
ATTORNEY

May 9, 1961  C. W. HELSLEY, JR  2,983,331
INVERTED FLIGHT RESERVOIR

Filed July 8, 1957  3 Sheets-Sheet 3

INVENTOR.
CHARLES W. HELSLEY, JR.
BY
Charles F. Dieckler
ATTORNEY

2,983,331

INVERTED FLIGHT RESERVOIR

Charles W. Helsley, Jr., Pacific Palisades, Calif., assignor to North American Aviation, Inc.

Filed July 8, 1957, Ser. No. 670,581

10 Claims. (Cl. 183—2.5)

This invention pertains to the degasification of a liquid and is particularly directed to a de-aerating mechanism that is effective in all attitudes and positions.

The present invention is capable of use in any liquid system requiring the separation of a gas therefrom. By way of illustration only, a non-limiting example would be of an oil lubrication system wherein the oil is sprayed as a mist or vapor over the bearing areas in order to cool and lubricate the same. The present invention will be specifically described in its application to a constant-speed-drive system as used for driving an A.-C. electrical generator in certain aircraft of the highly maneuverable fighter type. A typical constant-speed-drive unit of this type utilizes a closed hydraulic loop with a governor controlled variable displacement hydraulic pump driving a constant displacement hydraulic motor which in turn drives the generator at a constant speed. For aircraft operation, it is essential that the volume of the oil in the loop and reservoir be kept to a minimum to avoid a weight penalty. Even more important is the requirement that the generator output frequency be maintained within close limits. This requires a constant supply of substantially air-free oil to the fluid pump-motor unit as well as to the auxiliary lubricating sprays and jets.

Heretofore, devices have been disclosed in the prior art which are capable of separating gases from a liquid, but no satisfactory practical unit is known that will operate successfully in inverted or any angularly disposed attitude as well as in a normal flight position and under any "G" conditions, either negative or positive. Many of these prior art devices utilize the principle of a pivotally or swingably mounted reservoir for maintaining the air vent and liquid suction intake in proper relation to the liquid in the reservoir. Numerous flight tests of swiveling hopper-type reservoirs that depend upon such pivotal action to keep the suction ports submerged in oil have shown that aircraft frequently fly in such a manner that a smooth transition from positive to negative "G" occurs. Under these conditions no turning moment is created to swivel the reservoir and the oil moves directly from the bottom to the top of the reservoir leaving the suction port exposed to the tank atmosphere. Still other prior art devices utilize "flapper" or check valves to close off a predetermined separate volume of the reservoir, during deviation from a normal upright position of the aircraft and attached reservoir, to attempt to maintain a positive oil supply to the suction while the reservoir is subjected to negative "G." This type of device is prone to malfunction since the valves frequently stick or leak thereby causing the suction to immediately start drawing air. This device also necessitates the use of a bulky unit to provide the separate reservoir compartmentation with a consequently greater weight of oil required for operation. An additional disadvantage with this type of device is that, if the suction line should temporarily demand more oil than is being returned through the unit, the suction line would immediately cavitate or draw air.

These and other objections and disadvantages of the prior types of degasifying devices have been overcome and eliminated by the present invention. In accordance with this invention, a vortex-separator type degasifying mechanism, having no moving parts therein, is positioned within the oil reservoir and receives the mixture of oil and gas from the scavenging pump of the dry-sump type hydraulic system. The reservoir is divided into a vent chamber and an oil reservoir chamber which intercommunicate through one or more restricted apertures. The central or "core" portion of the separator always communicates with the vent chamber while the outer portion of the separator always communicates with the oil reservoir chamber regardless of the attitude of the separator.

Accordingly, it is an object of this invention to provide an oil degasifier unit that will operate with optimum and substantially constant efficiency in any attitude or position, and under any "G" loading condition.

Another object of this invention is to provide an oil de-aerator that operates with such efficiency that the quantity of oil in the system may be reduced to a minimum.

It is also an object of this invention to disclose a compact, minimum volume de-aerating device that is simply constructed and does not depend on any moving parts for its operation.

These and other objects and advantages of the present invention will become apparent to those skilled in the art after reading the present specification and the accompanying drawings forming a part thereof, in which.

Figure 1:
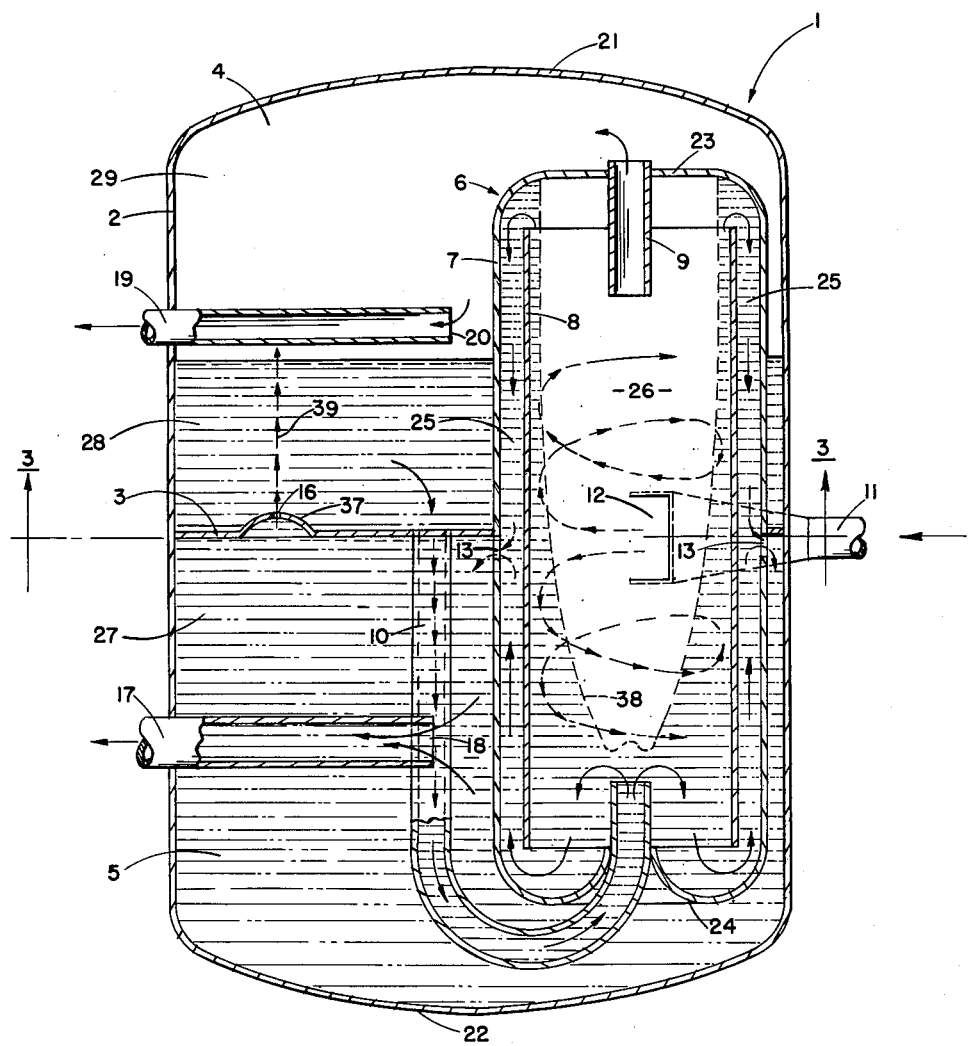
Fig. 1 is a sectional elevational view of the reservoir and degasifier in a normal upright position and illustrating the method of operation of the same.
Figure 2:
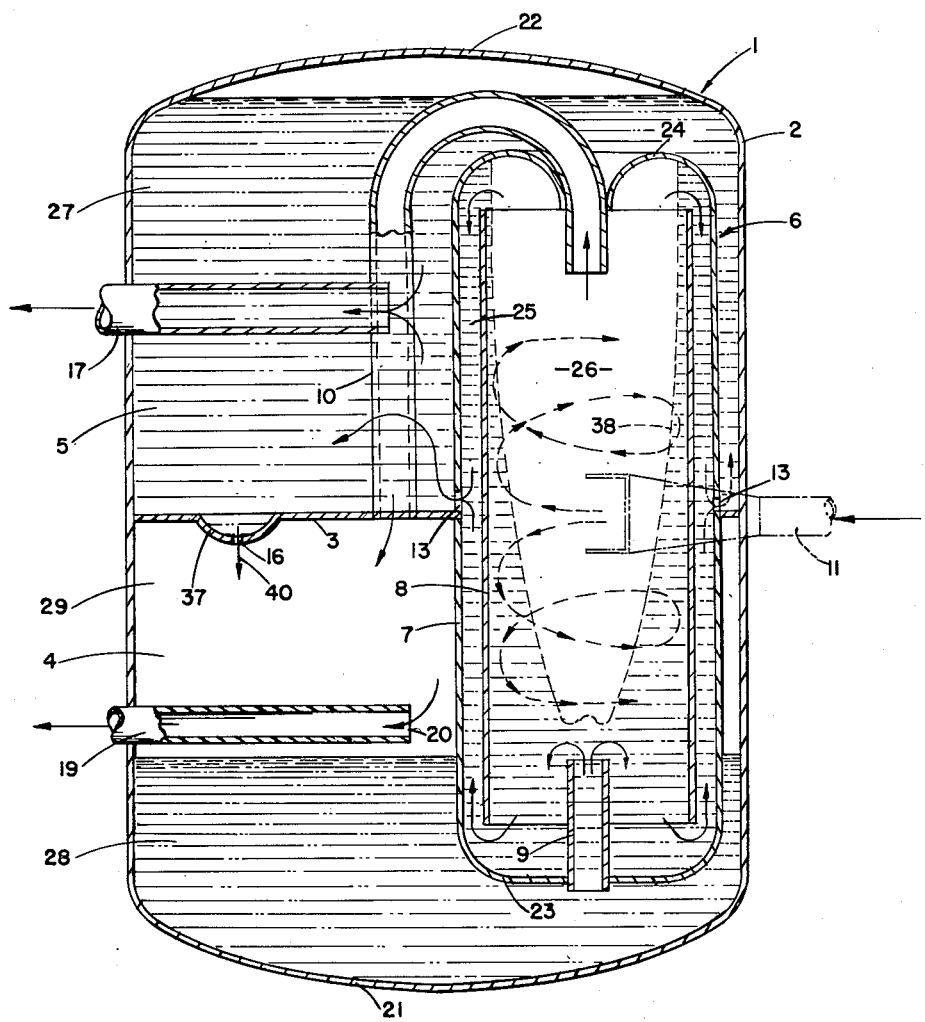
Fig. 2 is a sectional elevation view of the reservoir and degasifier in an inverted position illustrating the method of operation under these conditions.
Figure 3:
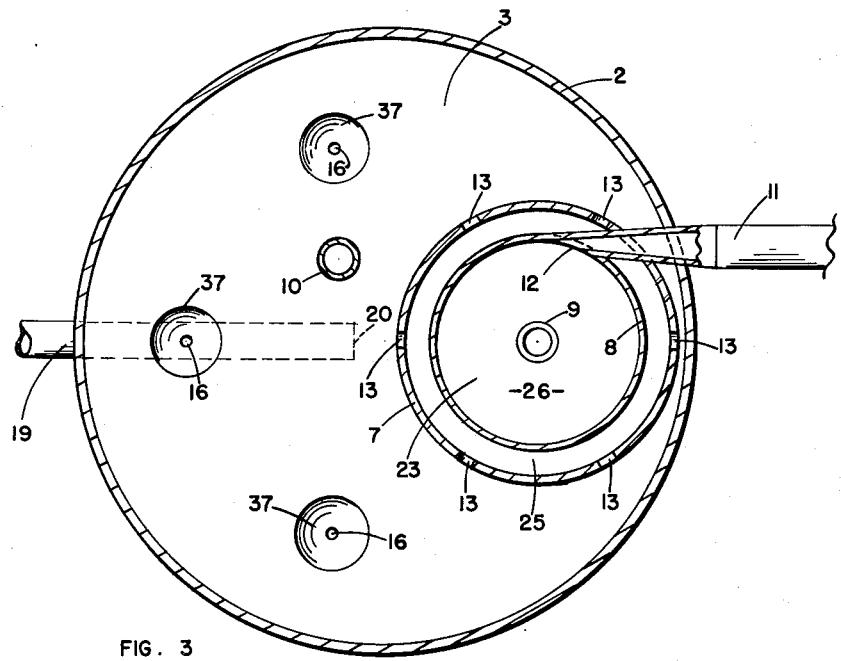
Fig. 3 is a transverse sectional view of the unit taken in the plane of line 3—3 in Fig. 1 without any liquid therein.

Referring specifically to the drawings wherein like reference characters have been used throughout the several views to designate like parts and referring at first to Fig. 1, the degasifying reservoir and separator unit is generally designated by the numeral 1. The unit comprises a generally cylindrical reservoir or tank shell 2 having dished heads 21 and 22 on the ends thereof to form an integral reservoir body. A transverse baffle plate 3 divides the interior of the tank into an upper chamber 4 and a lower chamber 5 of approximately equal volume. A vortex separator generally indicated by numeral 6 projects normally through an aperture in baffle plate 3 an equal distance on either side of the baffle. The separator is not centrally positioned within the reservoir but is disposed near the side wall of the tank with its longitudinal axis parallel to the tank longitudinal axis. Separator 6 is primarily comprised of generally cylindrical concentric inner and outer swirl chambers. Outer swirl chamber 7 is integral with baffle plate 3 and extends on either side thereof to a point near the ends 21, 22 of the reservoir. The ends 23, 24 of outer swirl chamber 7 are apertured for reception of the separator air outlet conduit 9 and oil standpipe conduit 10, respectively. The latter two conduits are labeled in accordance with their function when the separator and reservoir are in their normal upright position. Upon inversion of the unit the functions of these two conduits are interchanged and conduit 9 becomes the oil inlet to the swirl chambers and conduit 10 becomes the air outlet therefrom. Vent air outlet conduit 9 is centrally positioned in the upper end of swirl cylinder 7 and terminates at a point well within the air core of the vortex generated therein. Conduit 10 is U-shaped with legs of unequal length. The shorter leg of conduit 10 extends through the lower end 24 of swirl chamber 7 while the longer leg of this conduit extends upwardly through baffle 3. As shown in Figs. 1 and 2 the conduit 10 terminates flush with the upper surface of the baffle plate, although it may extend a considerable distance above the plate due to the large volume of oil normally standing over the plate. This stand-pipe 10 normally serves to supply oil under a positive static head to the lower end of the vortex to "pack" the oil side chamber 5.

Inner swirl cylinder 8 is essentially an open-ended tube concentrically positioned within outer swirl cylinder 7 and forming an annular swirl chamber 25 therebetween. Cylinder 8 stops short of each of ends 23 and 24 of cylinder 7 to allow flow of fluid around the ends into annular chamber 25. An aerated oil return line 11 extends through shell 1 and cylinder 7 and terminates in a tangentially directed outlet 12 along the inner wall of cylinder 8 at a point approximately equally distant from the ends of the cylinder.

Outer swirl cylinder 7 has a number of apertures 13 therethrough around its circumference at a point just slightly below baffle 3 or on the oil side of the baffle. These apertures communicate with the oil side and form passageways for the de-aerated oil to pass from the separator into oil reservoir chamber 5. Baffle plate 3 has one or more baffle bleed apertures 16 providing communication between the air side chamber 4 and the oil side chamber 5 for a purpose to be described later.

A suction line 17 extends through reservoir shell 2 into the oil side chamber 5 and terminates in a suction inlet 18 at the approximate center of volume of the oil side reservoir, thereby providing maximum availability of the oil for any reservoir attitude. Similarly, a vent line 19 extends through reservoir shell 2 into the air side chamber 4 and has a vent inlet located at the approximate center of volume of the air side chamber.

In operation, the reservoir is initially filled such that the total reservoir volume is apportioned approximately as follows: 50% of the oil is utilized to fill oil reservoir 5 below baffle 3; 20% of the oil is above baffle 3; and the remaining 30% of the reservoir volume is air above baffle 3. While for many conditions of operation the reservoir may be operated without pressurization, for use with constant-speed-drive units in aircraft operating at high altitudes, it is preferable that the air chamber 4 be pressurized to a value dependent upon the expected maximum flight altitude. In most instances, for dependable operation, the reservoir pressure should never be less than 7.5 pounds per square inch absolute (p.s.i.a.) while for maximum system reliability, 10 p.s.i.a. is preferable. This pressure is supplied from auxiliary sources through a nonventing pressure regulator 30 set to the desired value as shown in the schematic diagram of Fig. 4. For adequate control of the fluid vented, overboard relief valve 31 should be set at least 8 p.s.i. higher than the regulated pressure on the air side. Pressurization of the reservoir provides markedly increased reliability for high altitude performance, maintenance of positive prime, better cold starting characteristics and reduced overboard venting of oil.

After operation starts the oil-air mixture enters the inner swirl chamber at a high velocity through the tangential inlet. The resulting swirling action creates an induced vortex in inner swirl chamber 26. This vortex is truncated at top and bottom by the closed-ended swirl cylinder 7. The air, entrained in the entering oil, having a much lower density than the oil, moves to the center of the vortex as a result of centrifuging action. Thus, in effect, a cylinder of rapidly rotating oil is formed with a core of air at its center, as illustrated in Figs. 1 and 2 wherein numeral 38 indicates the air-oil interface of the vortex.

As more air is added by the incoming air-oil mixture, the air already in the core moves up and out of swirl chamber 26, through the normal separated-air outlet 9, into the air side chamber 4. This chamber is vented to maintain the air side at its proper predetermined pressure by means of overboard relief valve 31 acting in conjunction with pressure regulator 30. As more oil is added to the vortex the de-aerated oil simultaneously floods over the top and swirls under the bottom of the inner swirl cylinder 8 and continues swirling in the annular chamber 25 between cylinders 7 and 8. Gradually the swirling action is damped as the de-aerated oil moves towards the vortex separator oil outlet 13 and part of the total energy in the vortex is converted to a relatively high static pressure.

Oil outlet 13 communicates with the oil side of the baffle. This chamber tends toward a low static pressure as a result of the constant oil removal through suction inlet 18.

Oil entering the oil side chamber 5 will always have some residual air in it. This air will constantly settle out during its "dwell" time in the oil side chamber and bleed holes 16 in baffle 3 are provided to allow this air to reach the air side chamber 4. Apertures 16 are located in domes 37 which are formed in the baffle plate to facilitate collection of the residual air.

The removal of residual air is indirectly assisted by standpipe 10 which in the inverted position acts as the separated-air vent line. In normal flight attitudes standpipe 10 is submerged under a static head of oil created by the twenty percent volume of oil above the baffle. As a result, an auxiliary circuit is established in which oil flows down standpipe 10 into the bottom of the swirl chamber where it is entrained in the vortex and pumped out oil outlet holes 13 thereby "packing" the oil side chamber 5. It then fountains up through baffle bleed holes 16, as indicated by numeral 39 in Fig. 1, thereby carrying the residual air with it into chamber 4.

During inverted or negative "G" operation, as illustrated in Fig. 2, the performance of the de-aeration cycle remains largely unchanged. The aerated oil still enters at high velocity through tangential inlet 12. It still swirls in, de-aerates, and floods over both ends of inner swirl cylinder 8 and is then pumped out as substantially airfree oil to the oil side chamber 5 through outlets 13. However, since the reservoir is now inverted, the oil and air from the air side have changed places, with the air immediately beneath baffle 3 and the twenty percent oil volume resting on end 21 of the reservoir shell 2. Standpipe 10 is now open to the vortex air core and vent outlet conduit 9 is now submerged under a static head of oil. The separated air finds its way to the air side through U-shaped standpipe 10 and oil enters through the normal vent conduit 9, is entrained in the vortex and pumped into the oil side chamber 5. In the meantime, oil is bleeding through residual air bleed holes 16 from the oil side to the air side, as indicated by numeral 40 in Fig. 2. Almost immediately, however, an equilibrium is established in which the oil pumped up through vent conduit 9 and out through separator outlets 13 equals the oil bleeding down through baffle bleed hole 16 and inverted operation can be maintained indefinitely.

When the reservoir is operating on its side or in any other intermediate attitude, performance is essentially the same except that air leaves the vortex by whichever of the two conduits 9 and 10 offers the least resistance and oil enters to be pumped to the oil side chamber through the other conduit. It should be clear from the preceding discussion that the purpose of the inner-outer swirl chamber design is to maintain a constant mean flow path for the oil from return tangential inlet 12 to swirl chamber oil outlet 13, thus gaining more nearly uniform de-aeration in all the reservoir attitudes.

This reservoir is designed for operation in an oil supply system wherein the flow rate of the oil returning to the reservoir varies within narrow limits, during negative "G" operation, of from seventy to one-hundred percent and the oil returning to the reservoir is highly aerated, containing from thirty-five to fifty percent air. Operating under these conditions and without the use of any moving parts, this reservoir is capable of delivering a constant supply of de-aerated oil having no more than one to five percent air therein in all reservoir attitudes and under a wide range of acceleration loadings varying from minus 3.5 "G" to an indefinitely high positive value of "G."

For inverted flight or negative "G" conditions flooding of the constant-speed-drive unit casing will often result in a "demand" for more oil to be supplied to the unit than is required for normal positive "G" conditions. As previously pointed out prior art devices have been incapable of meeting this requirement and tended to draw air or cavitate. With the device of this invention, however, since the suction inlet is located at the approximate center of volume of oil chamber 5 this reservoir has the ability to supply a large amount of such make-up oil under any negative "G" condition.

Figure 4:
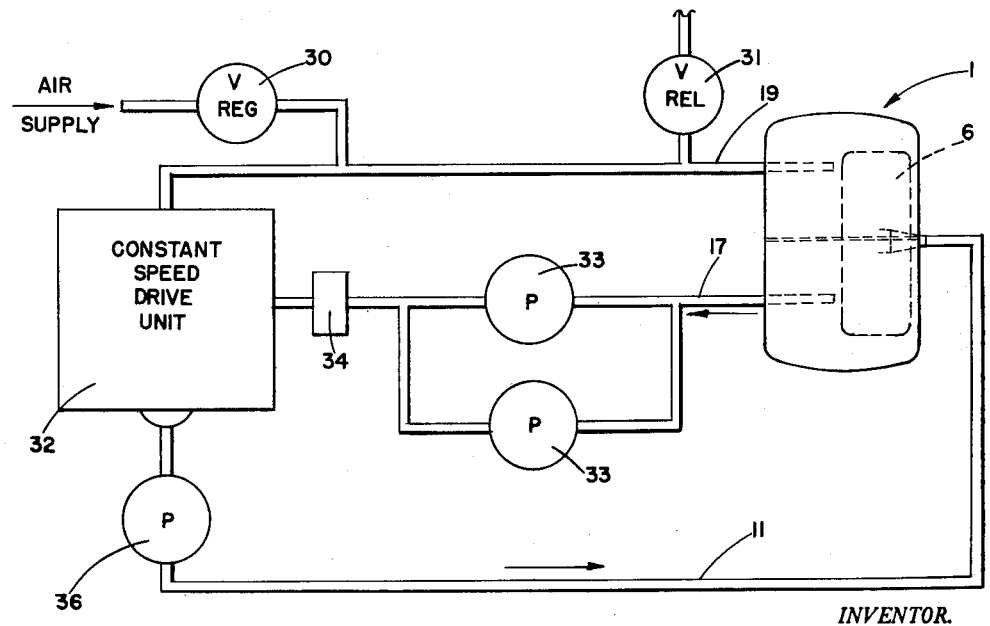
Fig. 4 is a diagrammatic view of the degasifying unit of this invention as utilized in a constant-speed-drive unit hydraulic circuit.

In the diagram comprising Fig. 4, a typical hydraulic circuit for the constant-speed-drive unit of an aircraft A.-C. generator is shown incorporating the inverted flight reservoir of this invention. Charge pumps 33 withdraw hydraulic fluid from the reservoir oil side 5 through a suction line 17 and cause the fluid to flow through charge filter 34 and thence to the constant-speed-drive unit for lubrication and motive power. The aerated oil within the drive unit casing is withdrawn by dry-sump type scavenge pump 36 and returned to the separator through return line 11 and thence to the tangential inlet 12 in the swirl chamber. The drive unit case 32 is connected to the pressure relief valve 31 and regulator valve 30 by vent line 19 for pressure stabilization of the unit.

It will be appreciated by those skilled in the art that the inventive concept disclosed herein is not limited to the particular configuration of the reservoir or separator portions of the described degasifier unit. For instance, production models of this unit have a generally rectangular reservoir arcuately curved, in a manner dictated by space requirements, for mounting on a turbojet engine.

Thus while particular embodiments of this invention have been illustrated and described herein it will be apparent that various changes and modifications may be made in the construction and the arrangement of the various parts without departing from the spirit and scope of this invention in its broader aspects or as defined in the following claims.

I claim:

1. A fluid degasifying device comprising a container, perforate means dividing said container into at least one gas chamber and one lquid chamber, a closed ended gas-liquid separator means positioned within said container and communicating with a source of pressurized gasified liquid; conduit means connecting the two ends of said separator means with said one gas chamber and permitting gas flow from said separator means into said gas chamber and liquid flow out of said gas chamber into said separator means in all attitudes of said device; means for allowing flow of substantially gas-free liquid from said separator means into said liquid chamber; means for venting said gas chamber to atmosphere; and means for permitting withdrawal of substantially gas-free liquid from said liquid chamber regardless of the attitude of said container.

2. A liquid degasifying device continuously operable in any attitude comprising a container; means dividing said container into a gas chamber and a liquid chamber, said chambers communicating with each other; a closed gas-liquid separator means in said container communicating with a pressurized gas-liquid media to be degasified, said separator having at least two ends, one of which in any given position contains substantially only gas while the other of said two ends contains substantially only liquid; conduit means directly connecting said two ends of said separator means with said gas chamber for permitting gas flow from either end of said separator into said gas chamber; means for allowing flow of substantially gas-free liquid from said separator means into said liquid chamber; means for venting said gas chamber to atmosphere; and means permitting withdrawal of substantially gas-free liquid from said liquid chamber in any attitude of said device.

3. A combined reservoir and gas separator unit that is position insensitive and has no moving parts comprising a tank; perforate means dividing said tank into a liquid reservoir chamber and a vented gas chamber while allowing restricted communication therebetween; a vortex separator fixedly mounted within said tank; conduit means continuously communicating gas from the uppermost end of said vortex separator to said gas chamber regardless of the position or attitude of the unit, said separator being connected to a source of pressurized gasified liquid that is to be degasified; means for allowing flow of substantially gas-free liquid from said separator means into said reservoir chamber; and means permitting withdrawal of liquid from said reservoir chamber in any attitude of the unit.

4. A position insensitive liquid degasifying device comprising a container, an apertured baffle in said container forming first and second chambers therein, said chambers communicating with each other, a longitudinally extending, generally cylindrical closed-ended tank positioned within said container, an open-ended cylinder positioned concentrically within said tank, a tangentially directed inlet means having a port in said cylinder wall connected to a source of pressurized gasified liquid that is to be degasified whereby said gasified liquid will be introduced into said cylinder with a swirling vortex flow path, a conduit extending from each end of said closed-ended tank into said first chamber for venting gas from said tank into said first chamber, said tank having at least one aperture therein intermediate its ends adapted to allow substantially gas-free liquid to flow from said tank into said second chamber, means for venting said first chamber, and means permitting withdrawal of substantially gas-free liquid from said second chamber.

5. A position insensitive liquid degasifying device as in claim 4 wherein at least one of said conduits extending from an end of said closed-ended tank is an unequal length U-tube having its shorter leg communicating with the end of said tank that is furthest from said first chamber and the longer leg communicating with said first chamber.

6. A position insensitive liquid degasifying device as in claim 4 wherein said first chamber is pressurized above atmospheric pressure.

7. A universally positionable fluid degasifying device comprising a container; means dividing said container into a gas chamber and a liquid chamber; means communicating with said gas chamber for withdrawal of gas therefrom; means communicating with said liquid chamber for withdrawal of liquid therefrom; a closed ended gas-liquid separator means positioned within said container and communicating with a source of pressurized liquid to be degasified; means connecting said gas chamber with said separator means for permitting flow of gas from said separator into said gas chamber; means connecting said liquid chamber with said separator for permitting flow of liquid from said separator into said liquid chamber; and secondary means for conducting fluid into said separator from said gas chamber when the container is in an upright position and for conducting gas into said gas chamber from said separator upon inversion of said container whereby gas may be withdrawn continuously from said gas chamber by the withdrawal means communicating with said gas chamber and liquid may be withdrawn from the liquid chamber by the withdrawal means communicating with said liquid chamber regardless of the attitude of the degasifying device.

8. A universally positionable liquid degasifier unit having no moving parts and capable of continuous operation despite any change in position comprising a container, means dividing said container into a first chamber and a second chamber, said means having at least one aperture therein allowing communication between said chambers, a deaerator means in said container, said deaerator means comprising a closed-ended generally cylindrical tank with an opened-ended cylinder positioned concentrically within said tank, a gasified liquid tangential inlet means in said deaerator, conduit means connecting the ends of said deaerator with said first chamber, means permitting communication between said second chamber and said tank, means for venting said first chamber, and liquid withdrawal means communicating with said second chamber.

9. A position insensitive degasifying unit having no moving parts comprising a container; means dividing said container when in a normal upright position into an upper and lower chamber; an elongate deaerator means longitudinally positioned in said container connected to a source of gasified liquid to be deaerated; means permitting communication between the upper chamber and the gas containing portion of the separator when said upper chamber is positioned substantially over said lower chamber; means permitting communication between the lower chamber and liquid portion of said deaerator; conduit means connecting the normally liquid portion of said separator with the upper chamber for supplying liquid from said upper chamber when the unit is positioned in its normal operative attitude with the the upper chamber over the lower chamber and for supplying gas from said separator to said normally upper chamber when the unit is inverted with the normally lower chamber over the normally upper chamber.

10. A fluid degasifying device comprising a container; perforate means dividing said container into a plurality of chambers therein including at least one gas chamber and one liquid chamber; a gas-liquid separator means positioned within said container and communicating with a source of pressurized gasified liquid; means for allowing flow of substantially liquid-free gas from said separator means into said gas chamber when the device is substantially in its normal upright position; means for venting said gas chamber; means for allowing flow of substantially gas-free liquid from said separator means into said liquid chamber; auxiliary means interconnecting and providing communication from said gas chamber to the end of the separator furthest removed therefrom whereby when said device is in its normal upright position fluid will be supplied from said gas chamber and when said one end of the separator is disposed at a higher relative elevation than the other end thereof gas will be supplied to said gas chamber; and means permitting withdrawal of substantially gas-free liquid from said liquid chamber regardless of the attitude of said container.

References Cited in the file of this patent

UNITED STATES PATENTS

| | | |
|---|---|---|
| 2,228,401 | Pressler | Jan. 14, 1941 |
| 2,353,833 | Kimmell | July 18, 1944 |
| 2,547,190 | Wilson | Apr. 3, 1951 |
| 2,793,708 | Carroll | May 28, 1957 |
| 2,800,975 | Carroll et al. | July 30, 1957 |